United States Patent
Magnoni et al.

(10) Patent No.: US 9,146,109 B2
(45) Date of Patent: Sep. 29, 2015

(54) MICROELECTROMECHANICAL GYROSCOPE WITH IMPROVED START-UP PHASE, SYSTEM INCLUDING THE MICROELECTROMECHANICAL GYROSCOPE, AND METHOD FOR SPEEDING-UP THE START UP PHASE

(71) Applicant: STMicroelectronics S.r.l., Agrate Brianza (IT)

(72) Inventors: Davide Magnoni, Varese (IT); Marco Garbarino, Bareggio (IT); Andrea Donadel, Meda (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 360 days.

(21) Appl. No.: 13/685,364

(22) Filed: Nov. 26, 2012

(65) Prior Publication Data

US 2014/0144230 A1 May 29, 2014

(51) Int. Cl.
*G01C 19/56* (2012.01)
*G01C 19/5726* (2012.01)

(52) U.S. Cl.
CPC ............ *G01C 19/5726* (2013.01); *G01C 19/56* (2013.01)

(58) Field of Classification Search
USPC ............... 73/504.12, 504.14, 504.15, 504.16, 73/504.02, 504.04
See application file for complete search history.

(56) References Cited

U.S. PATENT DOCUMENTS

| | | | | |
|---|---|---|---|---|
| 5,419,194 A * | 5/1995 | Varnham et al. | ............ | 73/504.13 |
| 6,553,835 B1 * | 4/2003 | Hobbs et al. | ................ | 73/514.16 |
| 6,564,637 B1 * | 5/2003 | Schalk et al. | ............... | 73/504.12 |
| 7,069,783 B2 * | 7/2006 | Uehara | ........................ | 73/514.12 |
| 7,305,880 B2 | 12/2007 | Caminada et al. | | |
| 7,827,864 B2 | 11/2010 | Prandi et al. | | |
| 8,375,789 B2 * | 2/2013 | Prandi et al. | ................ | 73/504.12 |
| 8,459,093 B2 * | 6/2013 | Donadel et al. | ................. | 73/1.37 |
| 8,474,317 B2 * | 7/2013 | Rizzo Piazza Roncoroni et al. | ........................... | 73/504.12 |
| 8,539,834 B2 * | 9/2013 | Prandi et al. | ................ | 73/504.12 |
| 8,714,012 B2 * | 5/2014 | Caminada et al. | .......... | 73/504.12 |
| 2006/0016260 A1 * | 1/2006 | Smith | ......................... | 73/504.03 |
| 2010/0077856 A1 * | 4/2010 | Troske et al. | ............... | 73/504.02 |
| 2014/0190258 A1 * | 7/2014 | Donadel et al. | ............ | 73/504.12 |
| 2014/0260609 A1 * | 9/2014 | Garbarino et al. | ......... | 73/504.12 |

* cited by examiner

*Primary Examiner* — Helen Kwok
(74) *Attorney, Agent, or Firm* — Seed IP Law Group PLLC

(57) ABSTRACT

A driving device of a driving mass of a gyroscope comprises a differential read amplifier to supply first signals indicating a rate of oscillation of the driving mass; a variable-gain amplifier to supply second signals to drive the driving mass based on said first signals; a voltage elevator providing a power supply signal to the variable-gain amplifier; a controller generating a first control signal to control a gain of the variable-gain amplifier; and a first comparator, coupled to the variable-gain amplifier, generating a second control signal based on a comparison of the first control signal with a threshold, the second control signal controlling at least one among: (i) the variable-gain amplifier in such a way that the gain is increased only during the start-up phase of the gyroscope, and (ii) the voltage elevator in such a way that the power supply signal is increased only during the start-up phase.

32 Claims, 10 Drawing Sheets

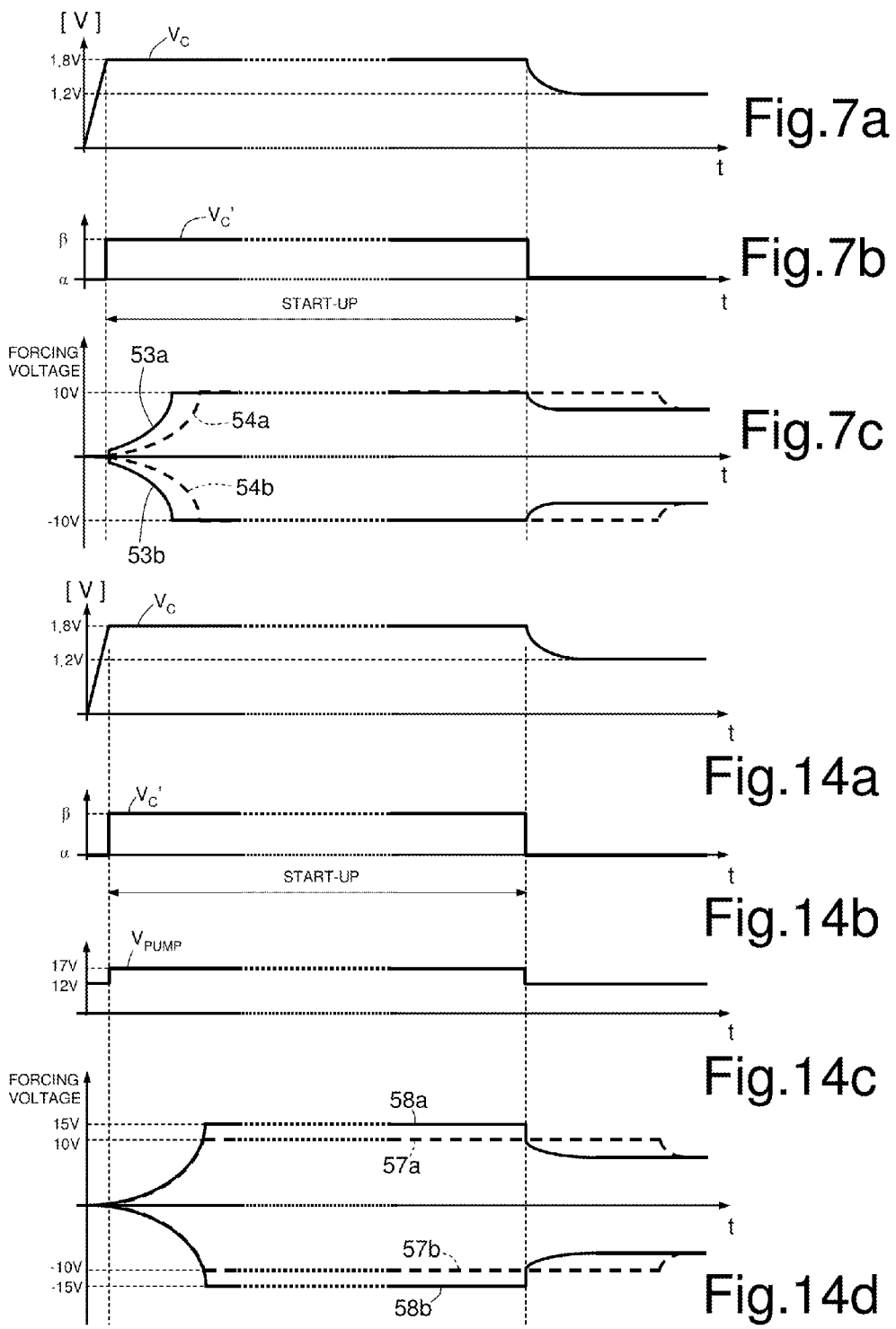

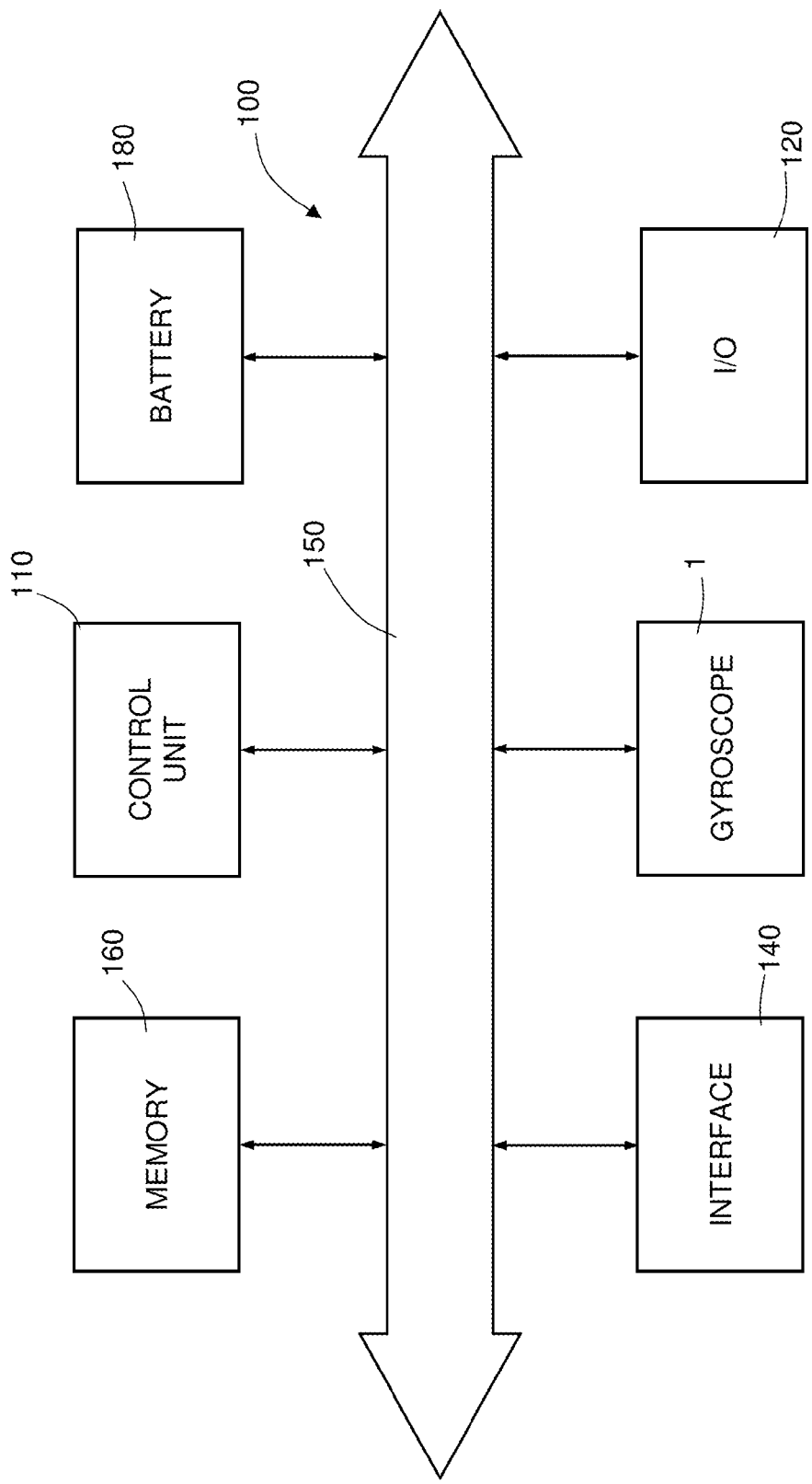

MICROELECTROMECHANICAL GYROSCOPE WITH IMPROVED START-UP PHASE, SYSTEM INCLUDING THE MICROELECTROMECHANICAL GYROSCOPE, AND METHOD FOR SPEEDING-UP THE START UP PHASE

BACKGROUND

1. Technical Field

The present disclosure relates to a microelectromechanical gyroscope with improved start-up phase, to a system including the microelectromechanical gyroscope, and to a method for speeding-up the start up phase.

2. Description of the Related Art

As is known, the use of microelectromechanical systems (MEMS) has become increasingly widespread in various sectors of technology and has yielded encouraging results especially in the production of inertial sensors, microintegrated gyroscopes, and electromechanical oscillators for a wide range of applications.

MEMS of this type are usually based upon microelectromechanical structures comprising at least one mobile mass connected to a fixed body (stator) by means of springs and mobile with respect to the stator according to pre-set degrees of freedom. The mobile mass is moreover coupled to the fixed body via capacitive structures (capacitors). The movement of the mobile mass with respect to the fixed body, for example on account of an external stress, modifies the capacitance of the capacitors, whence it is possible to trace back to the relative displacement of the mobile mass with respect to the fixed body and hence to the force applied. Conversely, by supplying appropriate biasing voltages, it is possible to apply an electrostatic force to the mobile mass to set it in motion. Furthermore, to obtain electromechanical oscillators the frequency response of the inertial MEMS structures is exploited, which is typically of a second-order lowpass type.

Many MEMS systems (in particular, all electromechanical oscillators and gyroscopes) use driving devices that have the task of keeping the mobile mass in oscillation.

The gyroscopes have a complex electromechanical structure, which comprises two masses that are mobile with respect to the stator and coupled together so as to have a relative degree of freedom. The two mobile masses are both capacitively coupled to the stator. One of the mobile masses is dedicated to driving (driving mass) and is kept in oscillation at the resonance frequency. The other mobile mass (sensing mass) is dragged along in oscillatory motion and, in the event of rotation of the microstructure with respect to a pre-set axis with an angular velocity, is subject to a Coriolis force proportional to the angular velocity itself. In practice, the sensing mass operates as an accelerometer that enables detection of the Coriolis force.

To enable actuation and produce an electromechanical oscillator where the sensor performs the role of selective frequency amplifier, with second-order transfer function of a lowpass type and high merit factor, the driving mass is equipped with two types of differential capacitive structures: driving electrodes and driving sensing electrodes. The driving electrodes have the purpose of sustaining the self-oscillation of the mobile mass in the direction of actuation. The driving sensing electrodes have the purpose of measuring, through the transduced charge, the position of translation or rotation of the sensing mass in the direction of actuation.

The U.S. Pat. No. 7,305,880 describes a system for controlling the rate of oscillation of the gyroscope, comprising a reading system including a differential read amplifier, a high-pass amplifier, and an driving-and-control stage, operating in a time-continuous way. All the components that form the reading system are of a discrete-time analog type and, in particular, are provided by means of fully differential switched-capacitor circuits.

The U.S. Pat. No. 7,827,864 describes an improvement of the previous control system, where the control loop comprises a filter having the purpose of reducing the offset and the effects of components and any parasitic coupling, operating on the overall gain and phase of the feedback loop.

To obtain a self-sustained oscillation of an electromechanical oscillator, at a constant amplitude, the loop according to the known art complies with the Barkhausen stability criterion, which is a mathematical condition to determine when a loop comprising linear blocks oscillates, and it is given by the following equations (1a) and (1b):

$$\begin{cases} |G_{LOOP}(\omega = \omega_{dr})| = 1 & (1a) \\ \varphi(G_{LOOP}(\omega = \omega_{dr})) = k \cdot 2\pi & (1b) \end{cases}$$

where the first equation means that the gain $G_{LOOP}$ of the loop at the driving frequency $\omega_{dr}$ must be unitary, and the second equation means that the phase shift $\varphi$ (accumulated by the signal in a round trip of the loop) must be an integer multiple of $2\pi$.

During the start-up phase of the electromechanical oscillator, equations (1a) and (1b) must be varied in such a way to obtain a time evolution of the oscillation up to reaching a desired oscillation amplitude, i.e., the gain $G_{LOOP}$ must be higher than a unitary gain. It follows that the following equations (2a) and (2b) are to be complied with during the start-up:

$$\begin{cases} |G_{LOOP}(\omega = \omega_{dr})| > 1 & (2a) \\ \varphi(G_{LOOP}(\omega = \omega_{dr})) = k \cdot 2\pi & (2b) \end{cases}$$

Under the condition sets out by equations (2a) and (2b) the oscillations of the electromechanical oscillator are free to evolve from the noise (always present in real systems). The aforementioned evolution follows, substantially, the following steps:

i. At a starting point, when the system is turned on, an error signal (the error signal being the difference between the target amplitude of oscillation and the effective amplitude) is considerably high; this error causes the control voltage of the VGA to its maximum value in a time which depends on the control strategy adopted.

ii. The gain of the loop is at the maximum value, thus the condition sets out by (2a) is assured and the system evolves from the noise signal;

iii. after a certain start-up transitory period, during which the oscillation amplitude rises, a desired oscillation amplitude is reached; at this point the condition sets out by (1a) must be respected.

The term transitory period at step (iii), indicates the period during which the oscillating mass of the electromechanical oscillator passes from a stationary condition (the mass does not oscillate) to an oscillating state where the mass oscillates at a controlled, desired, amplitude, or around the desired amplitude.

In the above identified systems, according to known embodiments, the start-up phase evolves slowly, since it evolves just from the noise.

BRIEF SUMMARY

The present disclosure is directed to a microelectromechanical gyroscope with improved start-up phase, to a system including the microelectromechanical gyroscope, and to a method for speeding-up the start up phase.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIGS. 7a-7c show an indicative time evolution of signals of the block diagram of the gyroscope of FIG. 4 when comprising the blocks of FIG. 6;

FIGS. 14a-14d show the time evolution of signals of the block diagram of the gyroscope of FIG. 10; and FIG. 15 is a simplified block diagram of an electronic system incorporating the gyroscope according to one embodiment of the present disclosure.

DETAILED DESCRIPTION

Figure 1:
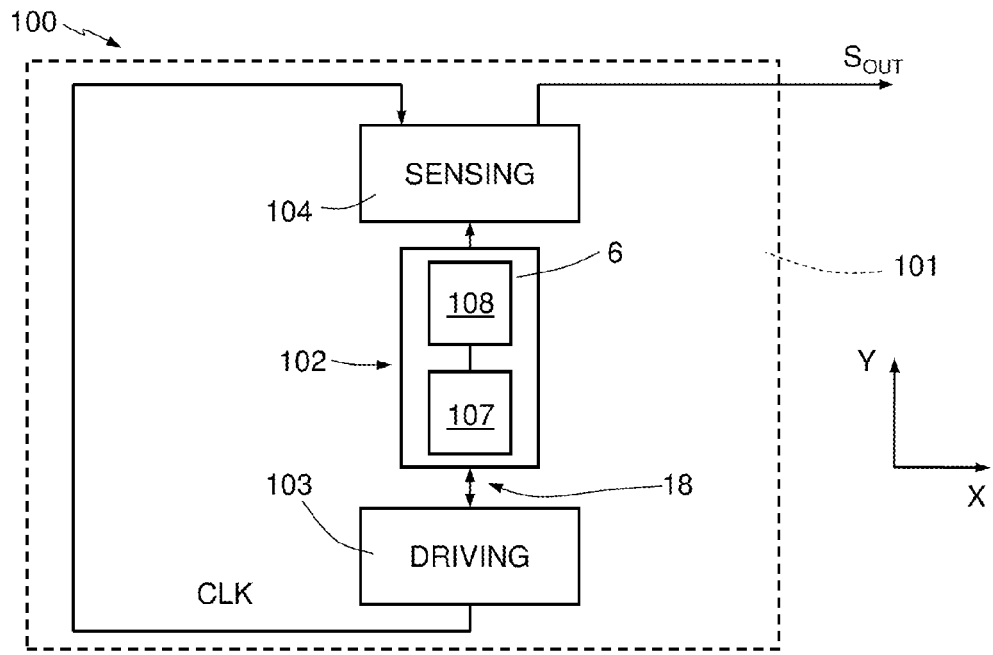
FIG. 1 is a simplified block diagram of a gyroscope.

FIG. 1 shows as a whole a microelectromechanical gyroscope 100, which comprises a microstructure 102, made of semiconductor material, a driving device 103, and a reading device 104.

The microstructure 102 is made of semiconductor material and comprises a fixed structure 6, a driving mass 107, and at least one sensing mass 108.

For reasons of simplicity, in the embodiment illustrated herein reference will be made to the case of a uniaxial gyroscope, present in which is just one sensing mass 108. What is described hereinafter applies, however, in the case of multi-axial gyroscopes, which comprise two or more masses or systems of sensing masses, for detection of rotations according to respective independent axes.

The driving mass 107 is elastically constrained to the fixed structure 6 so as to be able to oscillate around a resting position according to one translational or rotational degree of freedom. The sensing mass 108 is mechanically coupled to the driving mass 107 so as to be dragged along in motion according to the degree of freedom of the driving mass 107 itself. Furthermore, the sensing mass 108 is elastically constrained by elastic element to the driving mass 107 so as to oscillate in turn with respect to the driving mass 107 itself, with a respective further degree of freedom.

In the embodiment described herein, in particular, the driving mass 107 is linearly mobile along a driving axis X, whereas the sensing mass 108 is mobile with respect to the driving mass 107 according to a sensing axis Y perpendicular to the driving axis X. It is understood, however, that the type of motion (translational or rotational) allowed by the degrees of freedom and the arrangement of the driving and sensing axes can vary according to the type of gyroscope. With reference to the movements of the driving mass 107 and of the sensing mass 108, moreover, the expression "according to an axis" will henceforth be indifferently used to indicate movements along an axis or about an axis, according to whether the movements allowed for the masses by the respective degrees of freedom are translational (along an axis) or else rotational (about an axis), respectively. Likewise, the expression "according to one degree of freedom" will be indifferently used to indicate translational or rotational movements, as allowed by said degree of freedom.

Furthermore, the driving mass 107 (with the sensing mass 108) is connected to the fixed structure 6 so as to define a resonant mechanical system with a resonance frequency $\omega_R$ (according to the driving axis X).

Figure 2:
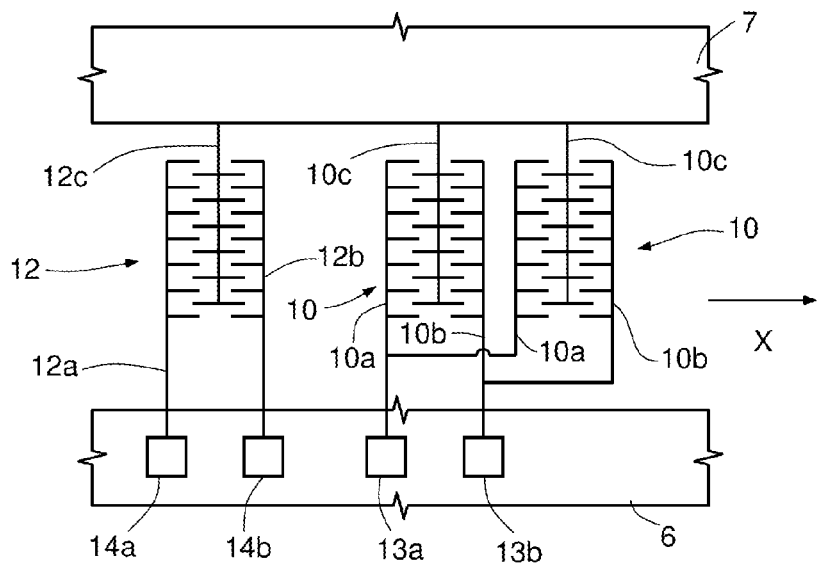
FIG. 2 is a top plan view of a microstructure included in the gyroscope of FIG. 1.

As illustrated in FIG. 2, according to one embodiment, the driving mass 107 is capacitively coupled to the fixed structure 6 by means of driving units 10 and feedback sensing units 12. The capacitive coupling is, for example, of a differential type.

In greater detail, the driving units 10 comprise first and second fixed driving electrodes 10a, 10b, which are anchored to the fixed structure 6 and extend substantially perpendicular to the driving direction X, and mobile driving electrodes 10c, which are anchored to the driving mass 107 and are also substantially perpendicular to the driving direction X. The mobile driving electrodes 10c are comb-fingered and capacitively coupled to respective first fixed driving electrodes 10a and second fixed driving electrodes 10b. Furthermore, the first and second fixed driving electrodes 10a, 10b of the driving units 10 are electrically connected, respectively, to a first driving terminal 13a and a second driving terminal 13b of the microstructure 102. As has been mentioned, moreover, the coupling is of a differential type. In other words, in each driving unit 10 a movement of the driving mass 107 along the driving axis X determines the increase in capacitance between the mobile driving electrode 10c and one of the fixed driving electrodes 10a, 10b. The capacitance between the mobile driving electrode 10c and the other of the fixed driving electrodes 10a, 10b decreases, instead, accordingly.

The structure of the feedback sensing units 12 is similar to that of the driving units 10. In particular, the feedback sensing units 12 comprise first and second fixed sensing electrodes 12a, 12b, anchored to the fixed structure 6, and mobile sensing electrodes 12c, which are anchored to the driving mass 107 and are comb-fingered and capacitively coupled to respective first fixed sensing electrodes 12a and second fixed sensing electrodes 12b. Furthermore, the first and second fixed sensing electrodes 12a, 12b of the feedback sensing units 12 are electrically connected, respectively, to a first feedback sensing terminal 14a and to a second feedback sensing terminal 14b of the microstructure 102.

In practice, hence, the driving mass 107 is coupled to the driving terminals 13a, 13b through differential driving capacitances $C_{D1}$, $C_{D2}$ and to the sensing terminals 14a, 14b through differential feedback sensing capacitances $C_{FBS1}$, $C_{FBS2}$.

Figure 3:
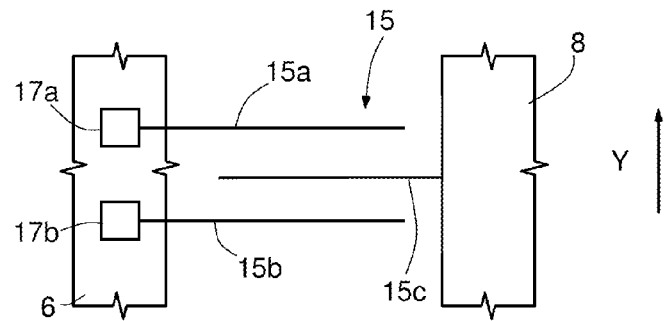
FIG. 3 is a top plan view of a further microstructure of the gyroscope of FIG. 1.

The sensing mass 108 is electrically connected to the driving mass 107, without interposition of insulating structures. Consequently, the sensing mass 108 and the driving mass 107 are at the same potential. The sensing mass 108 is moreover capacitively coupled to the fixed structure 6 by means of signal sensing units 15, as illustrated more clearly in FIG. 3. More precisely, the signal sensing units 15 comprise third and fourth fixed sensing electrodes 15a, 15b, anchored to the fixed structure 6, and mobile sensing electrodes 15c, which are anchored to the sensing mass 108 and are set between respective third fixed sensing electrodes 15a and fourth fixed sensing electrodes 15b. Also in this case, the capacitive coupling is of a differential type, but is obtained by means of electrodes with parallel plates, perpendicular to the sensing direction Y. Furthermore, the third and fourth fixed sensing electrodes 15a, 15b of the signal sensing units 15 are electrically connected, respectively, to a first signal sensing terminal 17a and to a second signal sensing terminal 17b of the microstructure 102. In practice, the sensing mass 108 is coupled to the signal sensing terminals 17a, 17b through signal sensing differential capacitances $C_{SS1}$, $C_{SS2}$.

Figure 4:
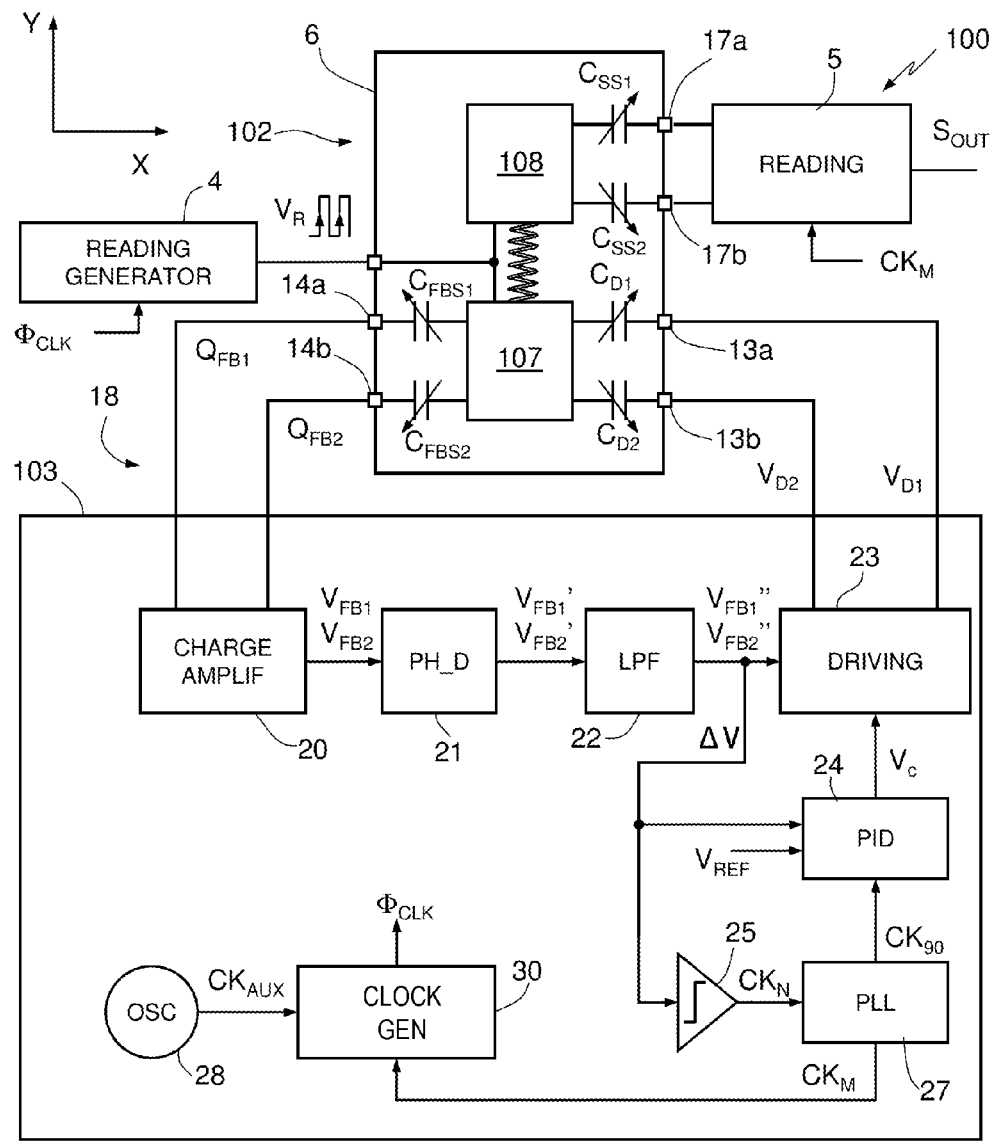
FIG. 4 is a more detailed block diagram of the gyroscope of FIG. 1.

FIG. 4 shows an embodiment of the gyroscope 100. The driving device 103 is connected to the driving terminals 13a, 13b and to the feedback sensing terminals 14a, 14b of the microstructure 102 so as to form, with the driving mass 107, a microelectromechanical oscillating loop 18, with control of position of the driving mass 107. The driving device 103 does not form the subject of the present disclosure, and can be of a type different from what has been described herein. The driving device 103 comprises a charge amplifier 20, a first phase-shifter module 21, a lowpass filter 22, a driving stage 23, a controller 24, a comparator 25, and a phase-locked-loop (PLL) circuit 27.

Furthermore, an oscillator 28 and a clock generator 30, controlled by the PLL circuit 27, are used for supplying clock signals for the driving device 103 itself, as well as for the reading device 104. The reading device 104 comprises, more in particular, a reading generator 4 and a reading circuit 5 (the latter being described in greater detail hereinafter).

The reading device 104 has an output 104a, which supplies an output signal $S_{OUT}$. In particular, the output signal $S_{OUT}$ is correlated to the acceleration to which the sensing mass 108 is subjected along the second axis Y and indicates the angular velocity Ω of the microstructure 102; i.e., it indicates a position of the sensing mass 108. The reading device 104 reads the displacements of the sensing mass 108, which are determined by the resultant of the forces acting on the sensing mass 108 itself along the second axis Y.

According to one embodiment, the driving device 103 exploits the loop to keep the driving mass 107 in self-oscillation along the first axis X at its resonance pulsation ωR. Furthermore, the driving device 103 generates a first clock signal $CK_M$ and a second clock signal $CK_{90}$, phase-shifted by 90° with respect to the first clock signal $CK_M$, and supplies at least one of them, or a clock signal correlated to one of them according to a known relation, to the reading device 104, so as to synchronize the operations of driving and reading of the microstructure 102. The gyroscope 100 hence operates on the basis of a known and shared synchronism. The gyroscope 100 operates in the way described in what follows. The driving mass 107 is set in oscillation along the first axis X and drags in motion in the same direction also the sensing mass 108. Consequently, when the microstructure 102 turns about an axis perpendicular to the plane of the axes X, Y with a certain instantaneous angular velocity, the sensing mass 108 is subject to a Coriolis force, which is parallel to the second axis Y and is proportional to the instantaneous angular velocity of the microstructure 102 and to the linear velocity of the two masses 107, 108 along the first axis X. More precisely, the Coriolis force ($F_C$) is given by the equation $$F_C = -2M_S \Omega X'$$

where $M_S$ is the value of the sensing mass 108, Ω is the angular velocity of the microstructure 102, and X' is the linear velocity of the two masses 107, 108 along the first axis X.

In practice, also the driving mass 107 is subject to a Coriolis force; however, said force is substantially countered by constraints that impose on the driving mass 107 movement exclusively along the first axis X.

The Coriolis force and acceleration to which the sensing mass 108 is subjected are detected. The signal thus detected can, however, comprise also a component due to spurious drag motions, which do not correspond to actual rotations of the miscrostructure 102 and are due to imperfections of the constraints of the driving mass 107 or else of the mechanical coupling to the sensing mass 108.

In particular, the output signal $S_{OUT}$ comprises a component correlated to the Coriolis force (and acceleration) and hence also to the instantaneous angular velocity of the microstructure 102, and a component correlated to the spurious drag motions. Furthermore, the output signal $S_{OUT}$ is a signal amplitude-modulated in a way proportional to the Coriolis force and, consequently, to the instantaneous angular velocity of the microstructure 102. The output signal is, in particular, a suppressed-carrier signal of a DSB-SC (Double Side Band-Suppressed Carrier) type. The band of pulsations associated to the modulating quantity, i.e., the instantaneous angular velocity, is much lower than the resonance pulsation $\omega_R$ (some orders of magnitude less). The resonance pulsation $\omega_R$ is, for example, comprised between 1 kHz and 30 kHz, whilst the band of pulsations associated to the modulating quantity is, for example, comprised between 1 Hz and 300 Hz. Said values are purely indicative of possible non-limiting embodiments.

Operation of the driving device 103 is briefly described with reference to FIG. 4. The charge amplifier 20 defines a detection interface for detecting the position x of the driving mass 107 with respect to the driving axis X. The remaining components of the driving device 103 co-operate for controlling, on the basis of the position x of the driving mass 107, the amplitude of oscillation of the microelectromechanical loop 18, in particular the amplitude of oscillation of the driving mass 107, and keeping it close to a reference amplitude. The reference amplitude is, in particular, determined by means of a reference voltage $V_{REF}$, which is supplied to the controller 24.

The charge amplifier 20 has inputs respectively connected to the first feedback sensing terminal 14a and to the second feedback sensing terminal 14b and defines a detection interface for detection of the position x of the driving mass 107 with respect to the driving axis X. The charge amplifier 20 receives differential charge packets $Q_{FB1}$, $Q_{FB2}$ from the feedback sensing terminals 14a, 14b of the microstructure 102 and converts them into feedback voltages $V_{FB1}$, $V_{FB2}$, which indicate the position x of the driving mass 107. In this way, the charge amplifier 20 performs a discrete-time reading of the position x of the driving mass 107.

The phase-shifter module 21 and the lowpass filter 22 carry out a conditioning of the feedback voltages $V_{FB1}$, $V_{FB2}$.

In greater detail, the phase-shifter module 21 is connected in cascaded mode to the charge amplifier 20 and introduces a phase shift as close as possible to 90° and in any case is comprised in the interval 90°±40°. In one embodiment, the phase-shifter module 21 comprises a sample-and-hold circuit and is moreover configured so as to carry out a first filtering of a lowpass type. Phase-shifted feedback voltages $V_{FB1}'$, $V_{FB2}'$ supplied by the phase-shifter module 21 are hence delayed and attenuated with respect to the feedback voltages $V_{FB1}$, $V_{FB2}$.

The lowpass filter 22 is arranged downstream of the phase-shifter module 21, is a fully differential second-order filter, and supplies filtered feedback voltages $V_{FB1}''$, $V_{FB2}''$ that are variable with continuity over time. The cutoff frequency of the lowpass filter 22 is selected in such a way that the frequency of oscillation of the microelectromechanical loop 18 (i.e., the driving frequency $\omega_D$ of the driving mass 107) is included in the passband and in such a way that the phase of the useful signal indicating the position x of the driving mass 107 is not substantially altered. Furthermore, the passband of the lowpass filter 22 is such that the undesired signal components, linked to the sampling by means of discrete-time reading, will be attenuated by at least 30 dB.

In order to prevent offsets that could jeopardize control of the oscillations of the microelectromechanical loop 18, both the phase-shifter module 21, and the lowpass filter 22 are based upon amplifiers provided with autozero function.

The driving stage 23 is of a continuous-time fully differential type and has variable gain. According to an embodiment, the driving stage 23 includes a VGA (Variable-Gain Amplifier) circuit. Furthermore, the driving stage 23 is set cascaded to the lowpass filter 22 and has outputs connected to the driving terminals 13a, 13b of the microstructure 102, for supplying driving voltages $V_{D1}$, $V_{D2}$ such as to sustain oscillation of the microelectromechanical loop 18 at the driving frequency $\omega_D$, which is close to the mechanical resonance frequency $\omega_R$ of the microstructure 102. For this purpose, the gain G of the driving stage 23 is determined by the controller 24 by means of a control signal $V_C$ correlated to the filtered feedback voltages $V_{FB1}''$, $V_{FB2}''$ supplied by the lowpass filter 22. The controller 24 is, for example, an AGC (Automatic Generation Control) equipped with a discrete-time PID (Proportional-Integral-Derivative) controller. In particular, the gain G is determined so as to keep the conditions of oscillation of the microelectromechanical loop 18 (unit loop gain and phase shift that is an integer multiple of 360°). For this purpose, the controller 24 receives at input the reference voltage $V_{REF}$, which indicates the desired reference oscillation amplitude. Furthermore, the driving stage 23 is configured for reversing the sign of the alternating differential components (AC components) of the driving voltages $V_{D1}$, $V_{D2}$ at each CDS cycle during the reading step. In greater detail, the driving voltages $V_{D1}$, $V_{D2}$ are respectively given by $$V_{D1} = V_{CM} + K_0 \sin \omega_A t$$

$$V_{D2} = V_{CM} - K_0 \sin \omega_A t.$$

In the above equations, $V_{CM}$ is a common-mode voltage of the driving stage 23, $K_0$ is a constant, and $\omega_A$ is the current oscillation frequency of the microelectromechanical loop 18 (close to the driving frequency $\omega_D$ in steady-state conditions). The differential components of the driving voltages $V_{D1}$, $V_{D2}$ are defined by the terms $K_0 \sin \omega_A t$. The second fraction of the cycle starts simultaneously with the sensing step and terminates slightly in advance.

In practice, the controller 24 generates the control signal $V_C$ on the basis of the difference between the voltages on one input and the reference voltage $V_{REF}$. Preferably, the gain of the VGA circuit depends linearly upon the control signal $V_C$.

The comparator 25 has inputs connected to the inputs of the driving stage 23, which define control nodes 25a, and receives the voltage difference ΔV between the feedback voltages $V_{FB1}''$, $V_{FB2}''$ filtered by the lowpass filter 22. The comparator 25 switches at each zero-crossing of the voltage difference ΔV, thus operating as a frequency-detection device. In one embodiment, the comparator 25 is connected to just one control node and switches at each zero-crossing of one between the filtered feedback voltages $V_{FB1}''$, $V_{FB2}''$ (the zero-crossings of the filtered feedback voltages $V_{FB1}''$, $V_{FB2}''$ and of the voltage difference ΔV coincide).

The output of the comparator 25, which supplies a native clock signal $CK_N$, is connected to an input of the PLL circuit 27 so as to enable phase locking with the microelectromechanical loop 18. The native clock signal $CK_N$ is, however, phase-shifted with respect to the driving mass on account of the presence of the charge amplifier 20, the first phase-shifter module 21, and the lowpass filter 22.

The PLL circuit 27 supplies a master clock signal $CK_M$ and a quadrature clock signal $CK_{90}$. The master clock signal $CK_M$ has a frequency equal to an integer multiple of the frequency of the native clock signal $CK_N$. If we denote by $\omega_M$ the frequency of the master clock signal $CK_M$ and by $\omega_N$ the frequency of the native clock signal $CK_N$, we hence have $\omega_M = K \omega_N$, for example with $K = 2^{10}$. The variable K can, however, assume different values, including unit value.

The quadrature clock signal $CK_{90}$ has the same frequency as and is phase-shifted by 90° with respect to the native clock signal $CK_N$ and is used for timing the controller 24. In practice, the quadrature clock signal $CK_{90}$ switches at the maxima and at the minima of the filtered feedback voltages $V_{FB1}''$, $V_{FB2}''$ at output from the lowpass filter 22. The controller 24 is thus correctly timed so as to sample the peak values of the voltage difference ΔV between the filtered feedback voltages $V_{FB1}''$, $V_{FB2}''$.

The oscillator 28 supplies to the clock generator 30 an auxiliary clock signal $CK_{AUX}$ having a calibrated frequency, close to the main frequency $\omega_M$.

The clock generator 30 receives the master clock signal $CK_M$ and the auxiliary clock signal $CK_{AUX}$ and uses them for generating the clock signals for the discrete-time components and, more in general, for proper operation of the gyroscope 100. The auxiliary clock signal is used when the PLL circuit 27 is not synchronized with the oscillations of the microelectromechanical loop 18 and hence the master clock signal $CK_M$ is not available, such as for example during steps of start-up or steps of recovery following upon impact. The master clock signal $CK_M$ is used when the oscillations of the microelectromechanical loop 18 are stabilized at the driving frequency $\omega_D$.

In detail, the clock generator 30 supplies a clock signal $\Phi_{CLK}$, which, in steady-state conditions, has a frequency equal to an integer multiple of the frequency of the native clock signal $CK_N$, for example equal to the frequency of the master clock signal $CK_M$.

The clock signal $\Phi_{CLK}$ is used for driving the reading generator 4 so as to supply to the driving mass 107 and the sensing mass 108 a square-wave reading signal $V_R$ of a duration equal to the duration of the sensing step.

The reading circuit 5 is configured for detecting a position y of the sensing mass along the sensing axis Y. In particular, the reading circuit 5 has an output supplying the output signal $S_{OUT}$.

In use, the driving mass 107 is set in oscillation along the driving axis X by the driving device 103 at the driving frequency $\omega_D$ in steady-state conditions. The sensing mass 108 is dragged in motion along the driving axis X by the driving mass 107. Consequently, when the microstructure 102 turns about a gyroscopic axis perpendicular to the plane of the axes X, Y with a certain instantaneous angular velocity Ω, the sensing mass 108 is subjected to a Coriolis force, which is parallel to the sensing axis Y and is proportional to the angular velocity Ω of the microstructure 102 and to the velocity of the two masses 107, 108 along the driving axis X.

The displacements of the sensing mass 108 caused by the Coriolis force are read by applying the reading signal $V_R$ to the sensing mass 108 itself and generating, on the basis of the differential charge packets thus produced, the output signal $S_{OUT}$. The controller 24, the comparator 25, and the PLL circuit 27 co-operate with the phase-shifter module 21, the lowpass filter 22, and the driving stage 23 for creating and maintaining the conditions of oscillation of the microelectromechanical loop 18 in different steps of operation of the gyroscope 100. In particular, the driving stage 23 applies to the driving mass 107 electrostatic forces such as to favor oscillations thereof at each instant.

Figure 5:
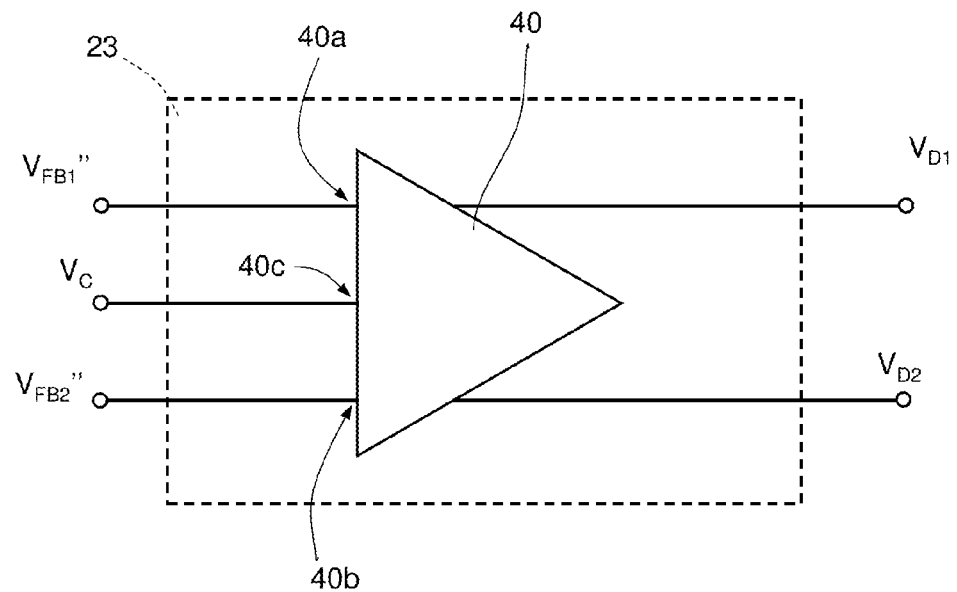
FIG. 5 is an embodiment of a variable gain amplifier of the block diagram of the gyroscope of FIG. 4.

FIG. 5 illustrates an embodiment of the driving stage 23, which comprises a fully differential variable-gain amplifier (VGA) 40. The variable-gain amplifier 40 has signal inputs 40a, 40b, connected to the lowpass filter 22 for receiving the filtered feedback voltages $V_{FB1}"$, $V_{FB2}"$, and a gain-control input 40c, connected to the controller 24 for receiving the control signal $V_C$. The outputs of the variable-gain amplifier 40 supply amplified voltages $V_{D1}$, $V_{D2}$, the difference of which is proportional, according to the gain determined by the control signal $V_C$, to the difference between the filtered feedback voltages $V_{FB1}"$, $V_{FB2}"$.

Figure 6:
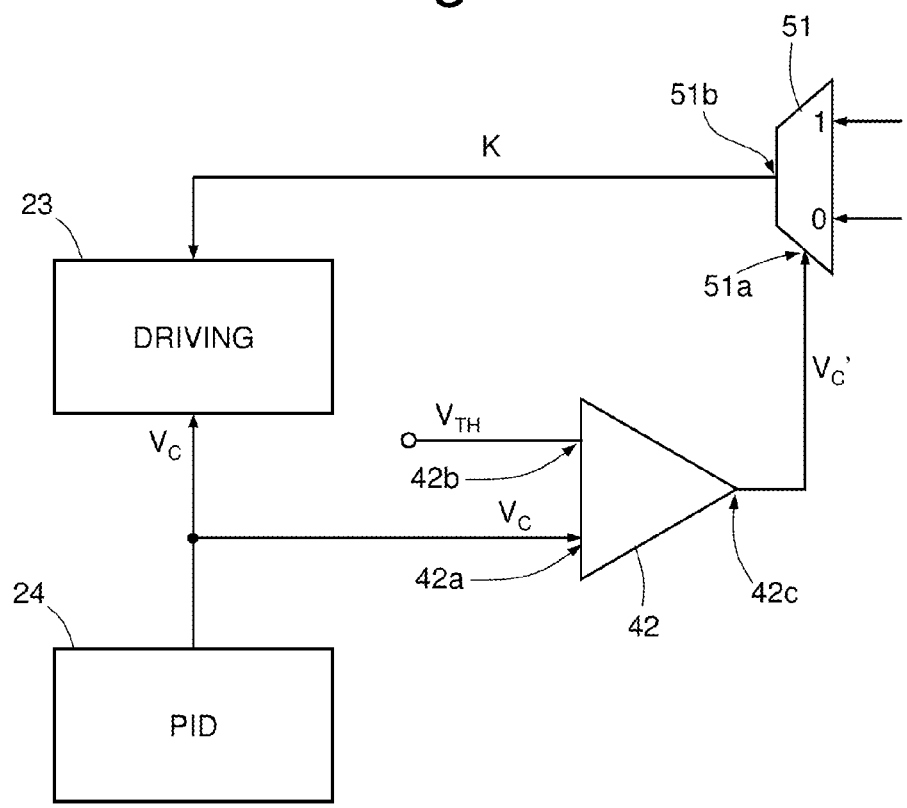
FIG. 6 is a further embodiment of a portion of the block diagram of the gyroscope of FIG. 4.

According to an aspect of the present disclosure, in order to further speeding up the start-up phase, the gain of the VGA 40 is further increased in such a way that, referring back to the known Barkhausen stability criterion, $|G_{LOOP}(\omega=\omega_{dr})|>1$. In order to assure the stability of the microelectromechanical oscillating loop 18 and avoid uncontrolled oscillation exceeding a certain amplitude, an adaptive system which controls the maximum gain of the microelectromechanical oscillating loop 18 is provided. To this end, as shown in FIG. 6, the microelectromechanical oscillating loop 18 comprises a comparator 42 having a first input terminal 42a coupled to the controller 24 for receiving the control signal $V_C$, a second input terminal 42b receiving a threshold signal $V_{TH}$, and an output terminal 42c, providing a control signal $V_C'$. The control signal $V_C'$ takes a high value (digital value "1") when the control signal $V_C$ at the first input terminal 42a is equal to, or higher than, the threshold signal $V_{TH}$, and a low value (digital value "0") when the control signal $V_C$ at the first input terminal 42a is lower than the threshold signal $V_{TH}$.

A signal based on the charge packets $Q_{FB1}$, $Q_{FB2}$ is propagated through the chain formed by the charge amplifier 20, the first phase-shifter module 21, and the lowpass filter 22, and is inputted to the controller 24. The controller 24 operates in a per se known way, calculating an error value as the difference between the measured process variable (voltage difference ΔV) and the desired reference value $V_{REF}$. The controller 24 attempts to minimize the calculated error by adjusting the process control inputs, i.e., providing the control signal $V_C$ having a value which depends on the calculated error and such as to optimize the gain of the VGA 40 to control the microstructure 102 according to the Barkhausen equations. During the start-up, the error measured by the controller 24 is so high that the control signal $V_C$ saturates, or reaches a value higher than a predefined threshold representing the maximum dynamic of the output of the controller 24. This means that the gain of the variable-gain amplifier 40, whose differential output is proportional to the difference between the filtered feedback voltages $V_{FB1}"$, $V_{FB2}"$ (with a proportionality sets by the value of the control signal Vc), cannot be further increased. The increase in the gain of the variable-gain amplifier 40 is thus provided by the control signal $V_C'$ generated by the comparator 42.

FIGS. 7a and 7b show, respectively, the time evolution of the control signal $V_C$ and the control signal $V_C'$. As visible in FIG. 7a, when the microelectromechanical gyroscope 100 is turned on, the control signal $V_C$ rapidly rises up to its saturation value, which, in this example is around 2 V. The comparator 42 of FIG. 6 receives on the first input terminal 42a, the control signal $V_C$ and, on its second input terminal 42b, the threshold signal $V_{TH}$. The threshold signal $V_{TH}$ is the threshold used to sense if the control signal $V_C$ has reached the saturation value (e.g., $V_{TH}$ may be set slightly below the saturation value, for example $V_{TH}$=1.8 V or 1.9 V). The output of the comparator 42, i.e., the control signal $V_C'$, has, substantially, a shape of a square wave. The control signal $V_C'$ is a voltage signal having a "low" value α and a "high" value β chosen according to the needs. When the control signal $V_C$ is lower than the threshold signal $V_{TH}$, the control signal $V_C'$ has the value α, while when the control signal $V_C$ is equal to or higher than the threshold signal $V_{TH}$, the control signal $V_C'$ has the value β.

According to an embodiment, the "low" value α and the "high" value β of the control signal $V_C'$ are provided to a control input 51a of a multiplexer 51. The multiplexer 51 generates, at an output terminal 51b, a value k=1 when the control signal $V_C'$ has the low value α, and k>1 when the control signal $V_C'$ has the high value β. According to this embodiment, the values α and β of the control signal $V_C'$ are not correlated to the output value k; instead they are used by the multiplexer 51 so as to control, in a per se known way, the outputted value of the output variable k.

According to another embodiment, the low value α and the high value β of the control signal $V_C'$ are, respectively, the unitary value (α=1) and the k>1 value (β=k>1), and are sent at input to a multiplexer which transfers at output the value α=k=1 when the control signal $V_C'$ has the low value a, and the value β=k>1 when the control signal $V_C'$ has the high value β. According to this embodiment, the values α and β of the control signal $V_C'$ are the values generated at output by the multiplexer outside the start-up period and, respectively, during the start-up period. According to the above, the start-up period is identified as the time period during which the control signal $V_C$ has a value higher than the value of the threshold signal $V_{TH}$. The latter information is intrinsically conveyed by the control signal $V_C'$. The value k is a gain factor which is used, together with the control signal $V_C$, to boost the output of the variable-gain amplifier 40 only during the start-up phase. When the control signal $V_C'$ saturates, the value k provides a boost to the gain. The gain of the variable-gain amplifier 40 can be expressed according to the following formula: $G_{VGA}=k \cdot f(V_C)$, where $G_{VGA}$ is the gain of the variable-gain amplifier 40 and $f(V_C)$ is a known function which represent the gain boost provided by the variable-gain amplifier 40 on the basis of the control signal $V_C$. The value k is chosen, for example, in the range of about 2 to 4.

The effect of the gain boost provided by the circuit of FIG. 6 is shown in FIG. 7c. As visible, the forcing voltage (in the figure it is represented the envelope of the forcing signal) when the comparator 42 and the multiplexer 51 are present (curves 53a, 53b) reaches a saturation value (e.g., ±10 V) at a time instant which precedes the time instant at which the same saturation value is reached by the curves 54a, 54b (in the absence of the comparator 42 and the multiplexer 51).

Figure 8A:
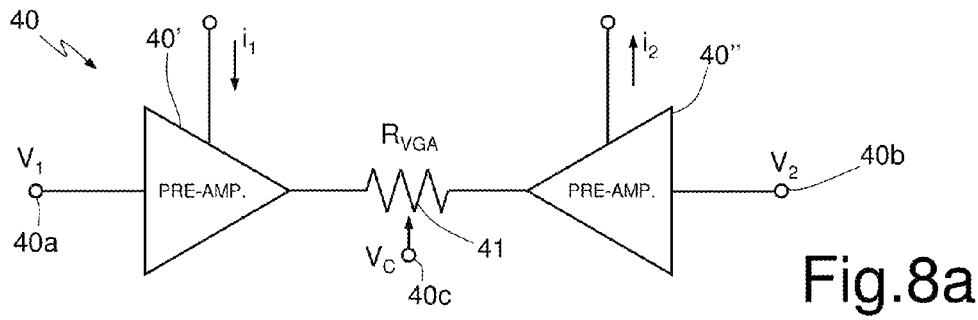
FIGS. 8a, 8b, 9a, 9b show respective embodiments of the variable gain amplifier of FIG. 5, with the aim of showing the working principle of the variable gain amplifier.
Figure 8B:
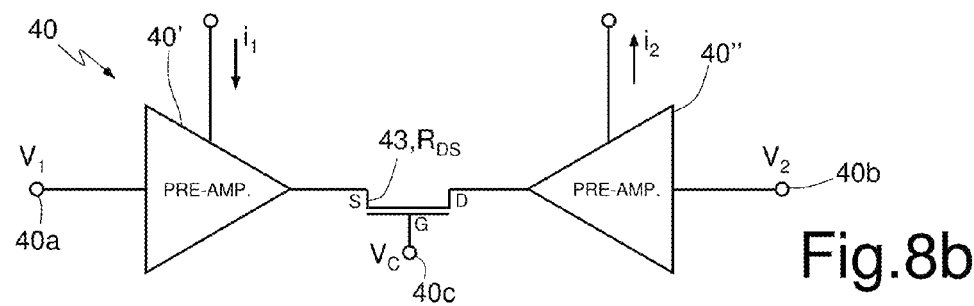

FIG. 8a shows a schematic embodiment of a portion of the variable gain amplifier 40, to show how it is possible to generate a current which depends on the input of the amplifier and on a value of a parameter which can be modified by the control signal $V_C$. In FIGS. 8a-8b the bias voltages, currents and possible additional signal components (which are anyway present), are omitted for simplification. According to FIG. 8a, the variable gain amplifier 40 includes a first input stage 40' and a second input stage 40". The first input stage 40' and the second input stage 40" are input pre-amplifiers, in other words voltage amplifiers having an opportune gain (in an embodiment, they have a unitary gain). The output terminals of the first input stage 40' and of the second input stage 40" are connected to opposite conduction terminals of a resistor 41. The resistor 41 has a resistance value which depends on the value of the control signal $V_C$ according to a function g ($R_{VGA}=g(V_C)$).

According to an aspect, as shown in FIG. 8b, the resistor 41 may be implemented by a transistor 43 (e.g., MOSFET) having the gate terminal G biased by the control signal $V_C$; accordingly, the drain-source resistance $R_{DS}=R_{VGA}$ of the transistor 43 depends on the value of the control signal $V_C$. The function g is the known function which links the drain-source resistance of a transistor (e.g., MOSFET) to the control signal applied to the gate terminal.

The functioning of the variable gain amplifier 40 is known; however, for completeness, it is briefly described herein; the gain of the first input stage 40' and of the second input stage 40" is considered to be unitary.

The first input stage 40' is configured to receive at input an input voltage $V_1=V_{in}/2$; the second input stage 40" is configured to receive at input an input voltage $V_2=-V_{in}/2$. Accordingly, the input differential voltage is $V_{in}$. When considering FIGS. 8a and 8b in conjunction with FIG. 5, the voltage $V_1$ is the signal $V_{FB1}$" provided at the input terminal 40a, and the voltage $V_2$ is the signal $V_{FB2}$" provided at the input terminal 40b. Voltage Vin is given by $V_{FB1}$"-$V_{FB2}$". Furthermore, the current at the input stage 40' is given by $i_1=V_{in}/R_{VGA}$ and the current at the second input stage 40" is given by $i_2=-V_{in}/R_{VGA}$. The output current $i_{out}$ provided by the variable gain amplifier 40 depends on the input voltage $V_{in}$ and on the value of the resistance $R_{VGA}$, and is given by:

$$i_{out}=i_1-i_2=2V_{in}/R_{VGA}.$$

Figure 9A:
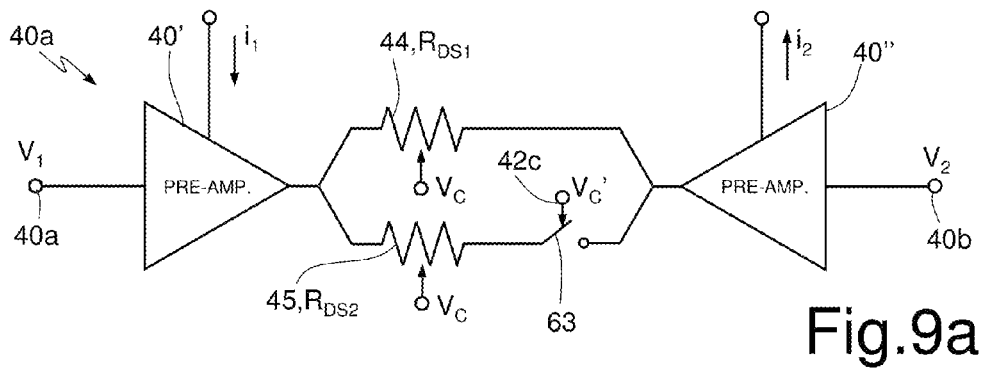
Figure 9B:
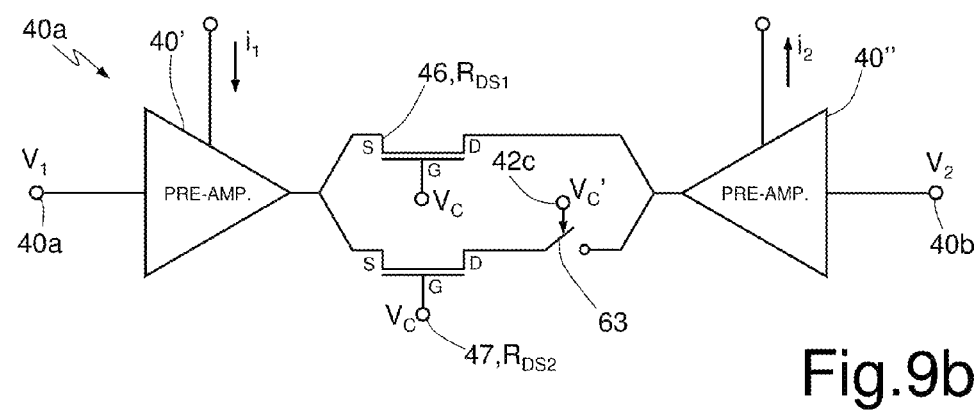

According to an aspect of the present disclosure, as shown in FIG. 9a, the variable gain amplifier 40 comprises two resistors 44 and 45, which couple the first input and the second input stage 40', 40". The resistors 44, 45 are coupled in parallel to one another. Moreover, a controlled switch 63 is connected in series to the resistor 45. In this way, the first and the second input stages 40', 40" are electrically connected to one another through the resistors 44 and 45 when the switch 63 is closed, and electrically connected through the resistor 44 only when the switch 63 is open. The resistors 44 and 45 are each analogous to the resistor 41 of FIGS. 8a, 8b, and may be implemented by a respective transistors (e.g., MOSFETs), as shown in FIG. 9b. In particular, according to an embodiment, the resistor 45 is a resistor of the same type as the resistor 44 (e.g., they are both formed by respective transistors 46, 47 having a same width over length W/L ratio).

According to further embodiments, resistors 44 and 45 may be different from one another (e.g., they are formed by respective transistors 46, 47 having a different W/L ratio), in particular, they may show a different resistance value $R_{DS1}$ and $R_{DS2}$ during use, when biased by the control signal $V_C$.

The switch 63 is, for example, a MOSFET transistor having the gate terminal G biased by the control signal $V_C$'. The switch 63 is configured in such a way that it is closed (i.e., it conducts electric current) when the control signal $V_C$' is high (i.e., when $V_C$'=β, during the start-up phase), and open when the control signal $V_C$' is low (i.e., when $V_C$'=α, outside the start-up phase). Accordingly, the gate terminal of the transistor which forms the switch 63 is coupled to the output 42c of the comparator 42.

When the switch 63 is open, the current flow is determined by the first transistor 44 only. Consequently, the equivalent resistance of the variable gain amplifier 40 is given by $R_{DS1}$ only; when the switch 63 is closed, the current flow is sustained by both the first and the second transistors 44, 45, and the equivalent resistance is given by the parallel of $R_{DS1}$ and $R_{DS2}$. By dimensioning the W/L parameter of the first and second transistor 44, 45 it is possible to set a desired value of $R_{DS1}$ and $R_{DS2}$ as a function of the control signal $V_C$.

For example, when the resistors 44 and 45 are transistors having the same technical features in terms of W/L ratio, and have the same response to the control signal $V_C$ applied, then $R_{DS1}=R_{DS2}=R_{DS}$. The equivalent resistance $R_{VGA}=R_{DS1}//R_{DS2}$ which couples the first input and the second input stage 40', 40" is given by $R_{VGA}=g(V_C)$ when the switch 63 is open, and by $R_{VGA}=1/2 \cdot R_{DS}=1/2 \cdot g(V_C)$ when the switch 63 is closed. Accordingly, it is provided an amplifier with a variable gain given by $i_{out}/V_{in}$ (where h assumes, in this example, the values 1 and 1/2):

$$\frac{i_{out}}{V_{in}} = \frac{2}{R_{VGA}} = \frac{2}{h \cdot g(V_C)} = k \cdot f(V_C).$$

The value k is the gain factor by which the gain of the variable gain amplifier 40 is increased only during the start-up phase (h=1/2 when $V_C$' is high, and h=1 when $V_C$' is low).

When the current $i_{out}$ has been generated (obtained from $V_{in}$ through a controlled gain by means of $V_C$) a number of techniques are well known in the known art in order to obtain voltages $V_{D1}$ and $V_{D2}$ (based on currents $i_1$ and $i_2$) adapted to drive the oscillator of the gyroscope.

Figure 10:
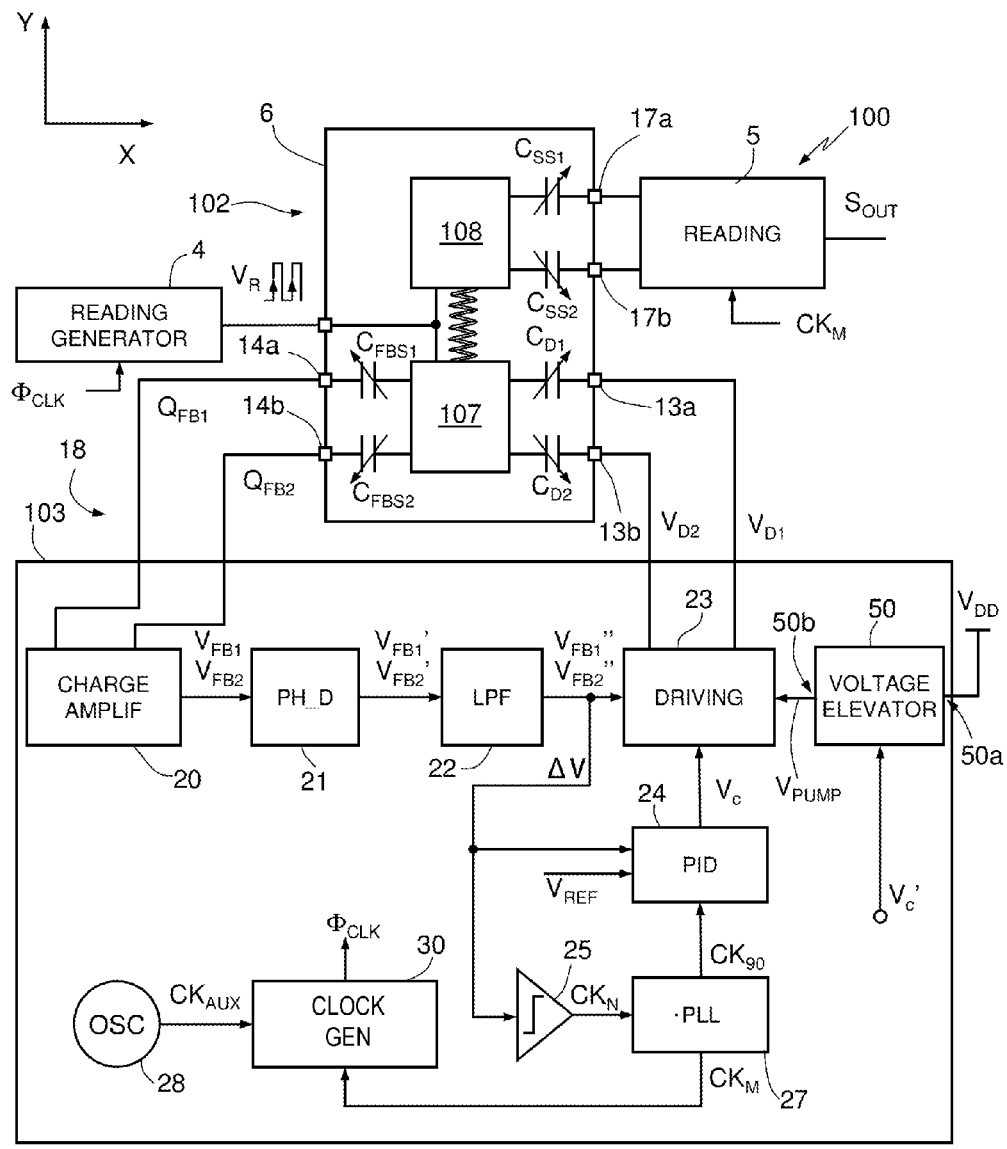
FIG. 10 shows a block diagram of a further embodiment of the gyroscope, including a voltage elevator for supplying the variable gain amplifier.

According to an aspect of the present disclosure, shown in FIG. 10, the driving device 103 further comprises a voltage elevator 50 (for example, a charge pump) connected to the driving stage 23 to supply the driving stage 23 with an adequate value of power supply, independently from the general supply voltage of the gyroscope (e.g., as provided by a battery).

According to a further embodiment of the present disclosure, the maximum dynamic of the forcing voltage applied by the driving stage 23 to the oscillating mass, through the driving voltages $V_{D1}$ and $V_{D2}$, is increased (in modulus). During the start-up phase the voltages $V_{D1}$ and $V_{D2}$ substantially oscillate between positive and negative saturation values; increasing the voltage provided by the voltage elevator 50, the effectively applied voltage is effectively increased.

According to this embodiment, the voltage elevator 50 provides for a boosted power supply (or enhanced voltage boost) during the operation of the driving stage 23. In particular, the voltage elevator 50 provides a boosted power supply to the driving stage 23 (in particular to the VGA 40) during the start-up phase of the microelectromechanical gyroscope 100, practically extending the output dynamic range of the variable-gain amplifier 40.

The enhanced or boosted power supply is generated, according to an aspect of the present disclosure, only during the start-up phase, i.e., when the control signal $V_C$' has the high value β. Outside the start-up phase, the voltage provided by the power supply elevator 50 is lower than the boosted or enhanced power supply provided during the start-up phase, according to the driving requisites outside the start-up phase.

Thus, using the information provided by the control signal $V_C'$, the boosted power supply signal $V_{PUMP}$ provided by the voltage elevator 50 to the driving stage 23 can be supplied only during the start-up phase. Accordingly, the start-up time is further reduced. To this end, the control signal $V_C'$ is furnished to an input terminal of the voltage elevator 50 and controls the voltage elevator 50 in such a way that the voltage elevator 50 supplies the driving stage 23 only during the start-up phase.

Figure 11:
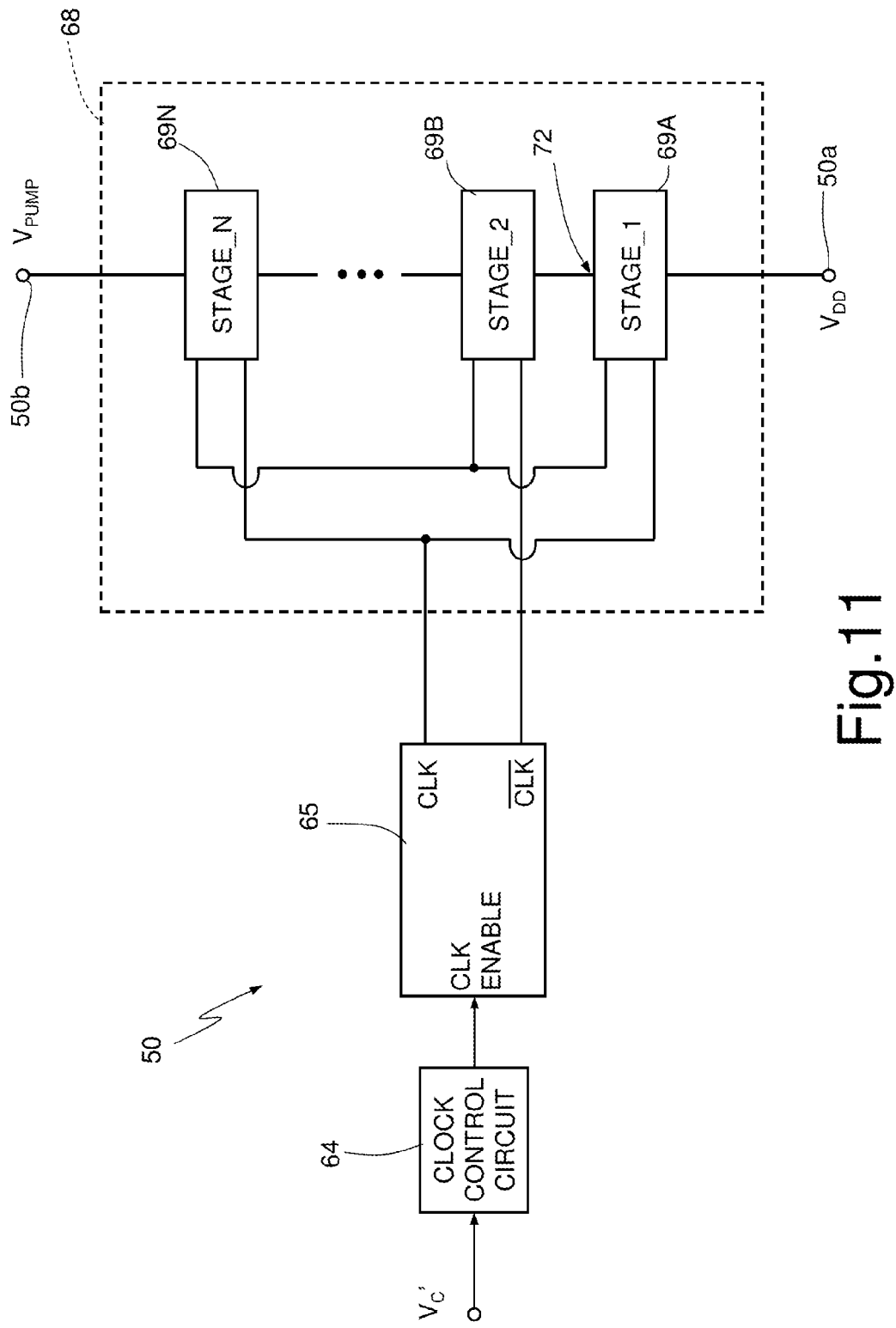
FIG. 11 is a block diagram of an embodiment of the voltage elevator of FIG. 10.

FIG. 11 shows an exemplary embodiment of a voltage elevator 50, in particular a charge pump system including a charge pump circuit controlled by the control signal $V_C'$ of the comparator 42. Voltage elevator 50 operates to boost an input voltage $V_{DD}$ (power supply of the voltage elevator 50) to a higher output voltage $V_{PUMP}$. Voltage elevator 50 includes a clock-control circuit 64, a clock driver 65, and charge pump circuit 68. Charge pump circuit 68 further includes one or more charge pump cells 69A-69N cascaded to one another, a charge pump input 50a, and a charge pump output 50b.

Figure 12:
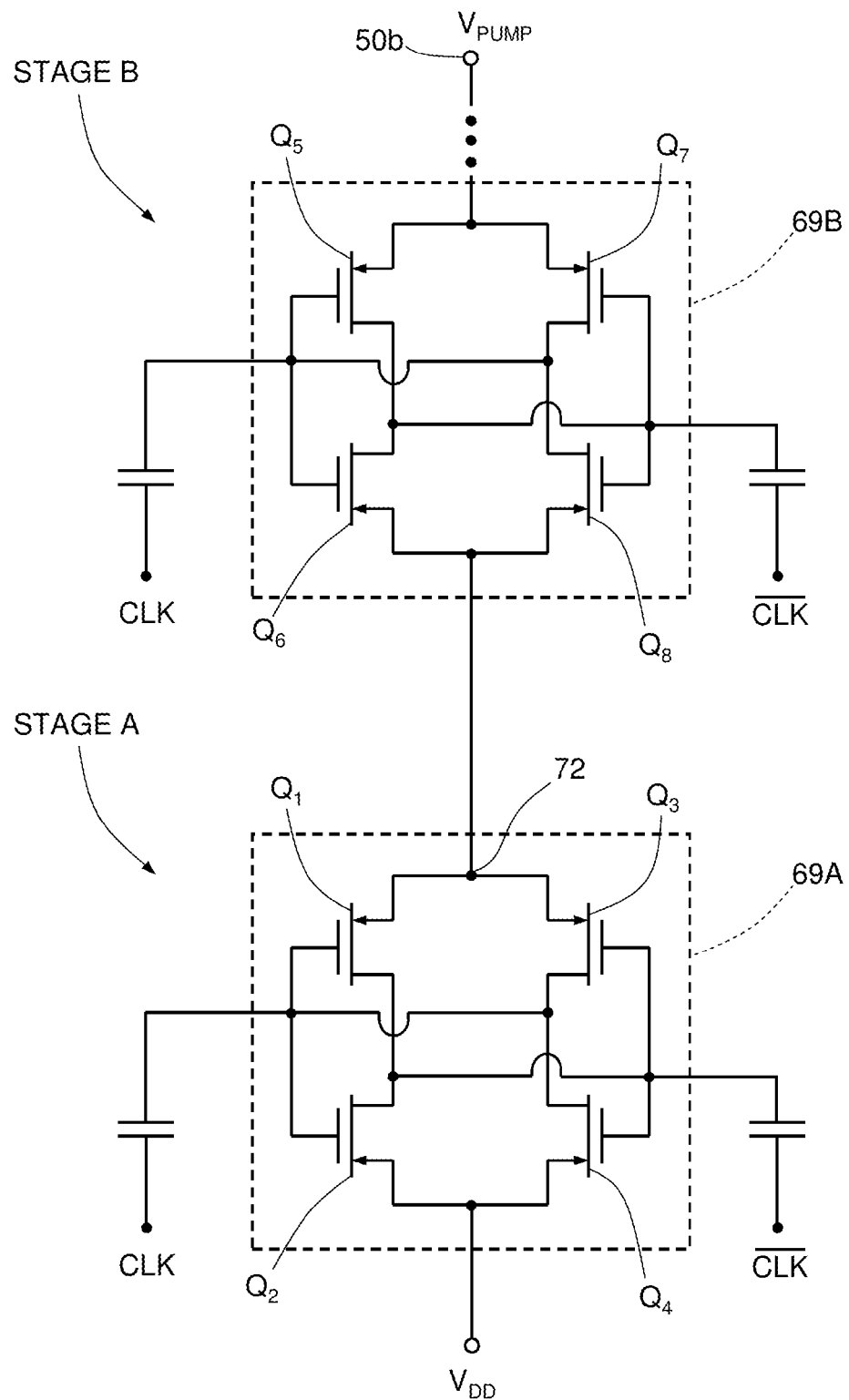
FIG. 12 shows an embodiments of stages of the voltage elevator of FIG. 11.

In one embodiment, the charge pump circuit 68 includes a plurality of N charge pump cells 69A-69N of the type shown in greater detail in FIG. 12. Each of the charge pump cells 69A-69N receives an input voltage and boosts the input voltage to a higher output voltage. The charge pump cells 69A-69N in the charge pump circuit 68 are cascaded in stages (STAGE_1 to STAGE_N), so that an output voltage of one charge pump cell becomes an input voltage of the next charge pump cell. Thus each stage generates a boosted voltage from the previous stage. The charge pump cell 69N in the final stage STAGE_N generates the final boosted output voltage $V_{PUMP}$.

For example, charge pump cell 69A of FIG. 12 boosts voltage $V_{DD}$, which is supplied to the charge pump input 50a. Charge pump cell 69A outputs the boosted voltage to the node 72, which is the output node of the charge pump cell 69A. A second stage STAGE_B (i.e., a further charge pump cell) is connected to the node 72 and is configured to further boost the already boosted voltage coming from the first stage STAGE_A and present at node 72; the second stage STAGE_B outputs a second stage boosted voltage, which can be the input for a third stage or, if no more stages are present, the output $V_{PUMP}$ of the voltage elevator 50. Any desired number N of stages may be present. In conclusion, the input voltage is thus successively boosted through the charge pump cells 69A of the first stage, and through the subsequent charge pump cells 69B-69N of the N stages.

Operation of the charge pump circuit 68 is controlled by the clock driver 65. Clock driver 65 supplies a clock signal CLK and an inverted clock signal /CLK (which is the clock CLK inverted) to the charge pump circuit 68. The clock signals CLK and /CLK are configured to control switches, which may be implemented by transistors or diodes, in the charge pump circuit 68 (see switches Q1-Q4 and Q5-Q8 of each stage in FIG. 12). The operation of these switches causes, in a per se known way, the charge pump circuit 68 to boost the voltage $V_{DD}$ received at the input 50a. For example, each on-off cycle of the switches boosts the input voltage by a small amount. Over several on-off cycles, the boosted output may reach a predefined target voltage (in this example, the target voltage is 17V). When the clock signals CLK and /CLK are turned off, the switching stops and the charge pump circuit ceases operation. The voltage $V_{PUMP}$ at the output node 50b then decreases at a rate depending on a load current being drawn from the output node 50b.

Thus, the voltage level of the output node 50b can be maintained near a target voltage by enabling and disabling the CLK and /CLK outputs of the clock driver 65. The control signal $V_C'$ provided by comparator 42 controls, through a clock-control circuit 64, this enabling and disabling of the clock driver 65. For example, during the start-up phase (which is identified by a predefined value β of the control signal $V_C'$) a higher voltage boost is desired, thus the clock-control circuit 64 enables and disables the clock driver 65 (acting on a clock-enabling input of the clock driver 65) at a higher frequency that outside the start-up phase; in this way, the output voltage $V_{PUMP}$ is maintained close to the desired target voltage. In an embodiment, the target voltage is set at 17V.

Figure 13:
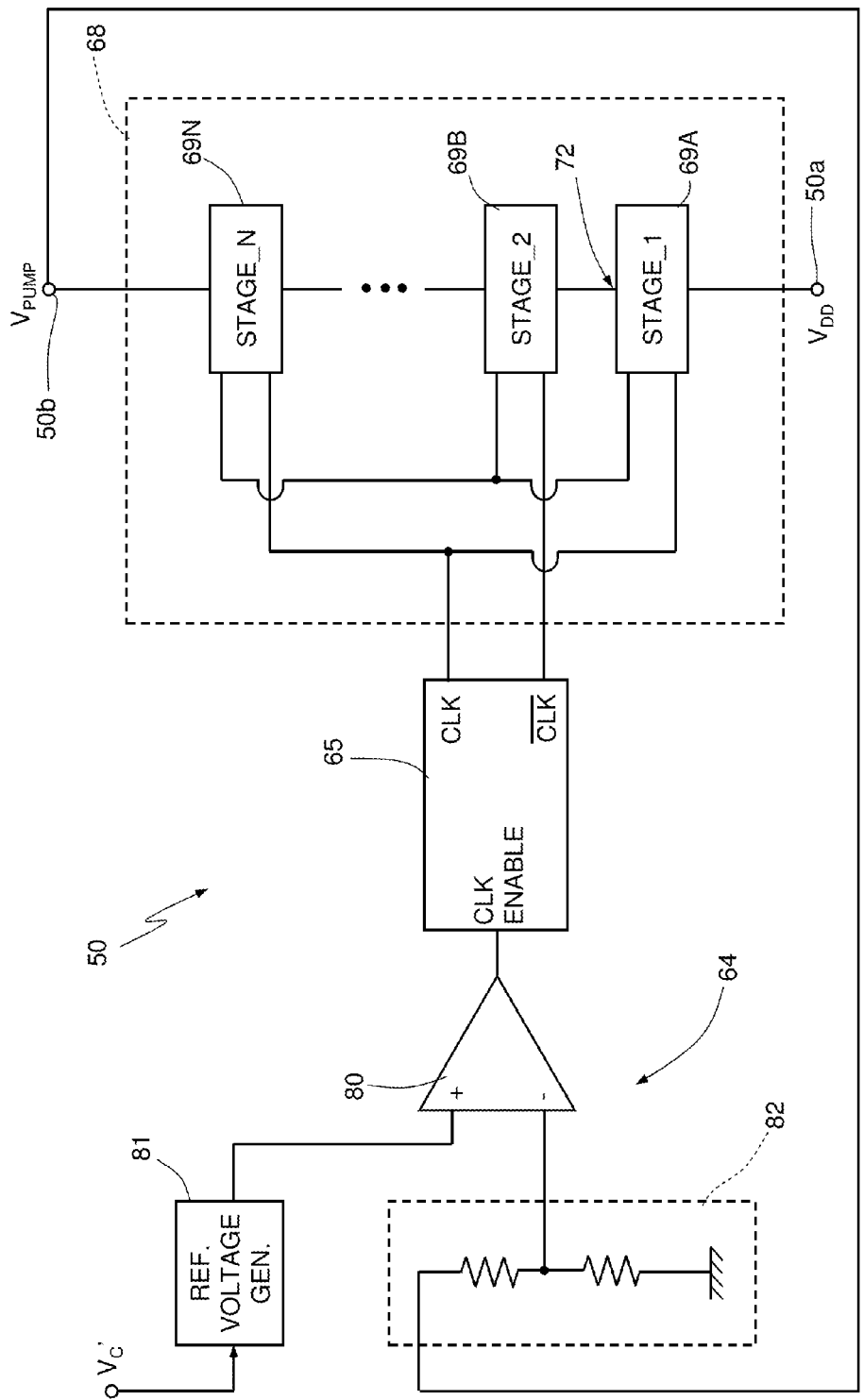
FIG. 13 is a block diagram of another embodiment of the voltage elevator of FIG. 10.

According to a more detailed embodiment, shown in FIG. 13, the clock-control circuit 64 comprises a comparator 80. Elements of the voltage elevator 50 of FIG. 13 common to elements of the voltage elevator 50 of FIG. 11 are indicated with same reference numbers and not further described.

The comparator 80 controls the enabling and disabling of the clock driver 65 based on the output voltage $V_{PUMP}$. In one embodiment, the comparator 80 receives at the inverting input terminal the output voltage $V_{PUMP}$, and at the non-inverting input terminal a reference voltage (target voltage). Since the output voltage $V_{PUMP}$ may reach relatively high values, in the embodiment shown in FIG. 13 a voltage divider 82 divides the output voltage $V_{PUMP}$, and then such a divided voltage is inputted at the inverting terminal of the comparator 80, to be compared with a reference voltage $V_{REF}$ (having a known proportionality with the target voltage) provided in a per se known way by a reference voltage generator 81. The comparator 80 is a hysteretic comparator, so that when the divided output voltage $V_{PUMP}$ reaches the lower limit of the hysteresis band, comparator 80 enables the clock driver 65. When the divided output voltage $V_{PUMP}$ reaches the upper limit of the hysteresis band, comparator 80 disables clock driver 65. Thus, when output voltage $V_{PUMP}$ falls below the threshold voltage, the clock driver 65 generates clock signals CLK and /CLK to cause the charge pump circuit 68 to raise the output voltage $V_{PUMP}$. When $V_{PUMP}$ reaches an upper threshold voltage, the clock driver 65 is disabled and the voltage $V_{PUMP}$ at output node 50b is allowed to decrease. For example, when the control signal $V_C'$ has the low value (outside the start-up phase), the output voltage $V_{PUMP}$ is controlled at 12V; instead, when the control signal $V_C'$ has the high value (during the start-up phase), the output voltage $V_{PUMP}$ is controlled at 17V.

According to the embodiment of FIG. 13, the control voltage $V_C'$ is inputted to the reference voltage generator 81 in such a way that the reference voltage $V_{REF}$ is changed to a new value corresponding to the desired value of the output voltage $V_{PUMP}$. As said, the reference voltage $V_{REF}$ is a voltage having a known proportionality with the output voltage $V_{PUMP}$, in order to be correctly compared with the divided voltage provided by the voltage divider 82 (e.g., the reference voltage $V_{REF}$ is reduced by a division factor equal to the division factor applied by the voltage divider 82 to the voltage $V_{PUMP}$).

FIGS. 14a-14c show the control signals $V_C$ and $V_C'$ (FIGS. 14a and 14b, analogous to FIGS. 7a and 7b) and the boosted power supply signal $V_{PUMP}$ (FIG. 14c). The relation which exists between the control signals $V_C$ and $V_C'$ has already been described.

With reference to FIGS. 14b and 14c, during use, when the control signal $V_C'$ has the low value α, the voltage elevator 50 supplies a first power supply voltage, e.g., $V_{PUMP}$=12V, to the driving stage 23 (FIG. 14c). When the control signal $V_C'$ rises to the high value β, the voltage elevator 50 is controlled in such a way to provide to the driving stage 23 a second power supply voltage higher than the first power supply voltage, e.g., $V_{PUMP}$=17 V. Then, when the control signal $V_C'$ drops to the low value α, the output of the voltage elevator 50 returns to the first power supply voltage $V_{PUMP}$=12 V. It is noted that the values 12V and 17V for the boosted voltage $V_{PUMP}$ are a mere example, and other voltage values may used if required.

FIG. 14d shows that, when the voltage elevator 50 provides a power supply boost to the driving stage 23, the envelope of the forcing voltage outputted by the driving stage 23 reaches (curves 57a, 57b) a higher maximum or saturation value than when the voltage elevator 50 is not controlled as previously described (curves 58a, 58b). It is noted that the forced voltage shown in FIG. 14d is the envelope of the forcing signal.

Illustrated in FIG. 15 is a portion of an electronic system 300 in accordance with one embodiment of the present disclosure. The system 300 incorporates the gyroscope 100 and can be used in devices such as, for example, a palmtop computer (personal digital assistant, PDA), a laptop or portable computer, possibly with wireless capacity, a cell phone, a messaging device, a digital music player, a digital camera, or other devices designed to process, store, transmit, or receive information. For instance, the gyroscope 100 can be used in a digital camera for detection of movements and carry out an image stabilization. In other embodiments, the gyroscope 100 is included in a portable computer, a PDA, or a cell phone for detection of a free-fall condition and activation of a safety configuration. In a further embodiment, the gyroscope 100 is included in a user interface activated by movement for computers or consoles for videogames. In a further embodiment, the gyroscope 100 is incorporated in a satellite navigation device and is used for temporary position tracking in the event of loss of the satellite positioning signal.

The electronic system 300 can comprise, in addition to the gyroscope 100, a controller 310, an input/output (I/O) device 320 (for example, a keyboard or a screen), a wireless interface 340 and a memory 360 of a volatile or nonvolatile type, coupled together through a bus 350. In one embodiment, a battery 380 can be used to supply the system 300. It is to be noted that the scope of the present disclosure is not limited to embodiments having necessarily one or all of the devices listed.

The controller 310 can comprise, for example, one or more microprocessors, microcontrollers, and the like.

The I/O device 320 can be used for generating a message. The system 300 can use the wireless interface 340 for transmitting and receiving messages to and from a wireless communication network with a radiofrequency (RF) signal. Examples of wireless interface can comprise an antenna, a wireless transceiver, such as a dipole antenna, although the scope of the present disclosure is not limited from this standpoint. Furthermore, the I/O device 320 can supply a voltage representing what is stored either in the form of a digital output (if digital information has been stored) or in the form of analog information (if analog information has been stored).

Finally, it is evident that modifications and variations may be made to the resonant microelectromechanical system described herein, without thereby departing from the scope of the present disclosure.

For instance, the reading device 104 can moreover comprise an anti-aliasing filter set downstream of the analog-to-digital converter 124.

Furthermore, the disclosure can advantageously be exploited to obtain electromechanical oscillators of any type, as already mentioned previously. Furthermore, the reading device according to the disclosure can be used in gyroscopes having microstructures different from the ones described. For instance, the driving mass and the sensing mass could be in direct electrical connection with one another, without insulation regions. In this case, it is, however, preferable to associate an offset-compensation stage to the transimpedance amplifier. As an alternative, it is also possible to use a single mass with driving and sensing systems for two independent axes.

Furthermore, the disclosure can advantageously be exploited in: gyroscopes with one or more sensing masses that are linearly mobile with respect to the driving mass and sensitive to rotations of pitch and/or roll (in addition to yaw); gyroscopes with cantilever sensing masses or with beams oscillating about centroidal or non-centroidal axes; and uniaxial and multiaxial gyroscopes with angularly oscillating driving mass.

Furthermore, it is clearly possible to use a different number of clock signals, with different phase relations to carry out driving of the microelectromechanical loop. In this connection, it is possible to generate the clock signals using a single master clock signal supplied by an asynchronous oscillator calibrated at the driving frequency. The PLL circuit can thus be eliminated, with considerable saving in terms of area occupation and of additional components external to the chip.

According to further embodiments, the on/off loop for voltage control of the charge pump described with reference to FIG. 11 is not limitative of the present disclosure; other control loops may be used, according to the known art.

Furthermore, other typologies of voltage elevator or charge pumps may be used, for example charge pump with frequency feedback, or charge pumps with open loop, known in the art.

According to further embodiments, the gain boost may be obtained by providing a boosted power supply to any other block belonging to the microelectromechanical control loop 103, analogously to what described with reference to the voltage-gain amplifier 40 of the driving block 23.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
    a body; and
    a microelectromechanical control loop configured to have a loop gain, and including:
        a driving mass mobile with respect to the body with a first degree of freedom according to a driving axis;
        a differential read amplifier configured to supply first intermediate signals indicating a rate of oscillation and an amplitude of said driving mass;
        a driving device coupled to the driving mass and configured to supply, based on said first intermediate signals, second intermediate signals that drive said driving mass such as to keep the driving mass in oscillation according to the driving axis at a driving frequency;
        a voltage elevator coupled to the driving device and configured to provide to the driving device a first power supply signal having a first power supply value and a second power supply signal having a second power supply value;

a sensing mass mechanically coupled to the driving mass and configured to move according to the driving axis, the sensing mass being mobile with respect to the driving mass with a second degree of freedom according to a sensing axis, in response to rotations of the body, wherein:
the microelectromechanical control loop is configured to have the loop gain of a first gain value during a start-up phase of said microelectromechanical gyroscope,
the driving device is configured to be supplied by the first power supply signal during the start-up phase,
the microelectromechanical control loop is configured to have the loop gain of a second gain value outside of said start-up phase,
the driving device is configured to be supplied by the second power supply signal outside of said start-up phase, and
the first gain value is higher than the second gain value and/or the first power supply value is higher than the second power supply value.

2. The microelectromechanical gyroscope according to claim 1, wherein said microelectromechanical control loop comprises:
a variable-gain amplifier included in the driving device and configured to receive said first and second power supply signals and supply said second intermediate signals based on said first intermediate signals;
a controller configured to generate a first control signal to control a gain of said variable-gain amplifier in such a way to provide said first and second gain values; and
a first comparator operatively coupled to the variable-gain amplifier and configured to generate a second control signal indicative of said start-up phase and configured to control at least one among: (i) the variable-gain amplifier in such a way that the gain of the variable gain amplifier has the first gain value higher than the second gain value only during said start-up phase, and (ii) said voltage elevator in such a way that causes said voltage elevator to supply the first power supply signal only during said start-up phase.

3. The microelectromechanical gyroscope according to claim 2, wherein the first comparator is configured to generate the second control signal based on a comparison of the first control signal with a threshold indicative of an operative condition of the first control signal, said start-up phase being a time period during which the first control signal is above the threshold.

4. The microelectromechanical gyroscope according to claim 3, wherein the operative condition is a saturation of the first control signal.

5. The microelectromechanical gyroscope according to claim 2, wherein the first comparator is configured to generate the second control signal based on a comparison of an error signal with a predefined threshold, said start-up phase being a time period during which the error control signal is above the threshold, the error signal being a signal difference between a target amplitude of oscillation of the sensing mass and an effective amplitude of oscillation of the sensing mass.

6. The microelectromechanical gyroscope according to claim 2, wherein the voltage elevator includes a charge pump circuit.

7. The microelectromechanical gyroscope according to claim 6, wherein the voltage elevator further comprises a clock driver operatively coupled with the charge pump circuit and configured to provide a clock signal to the charge pump circuit in such a way to maintain an output voltage of the charge pump circuit near a target voltage having a value related to a corresponding value of said second control signal.

8. The microelectromechanical gyroscope according to claim 7, wherein the voltage elevator further comprises a second comparator configured to output a compared signal based on a comparison between a reference voltage that is proportional to said target voltage and a voltage that is proportional to the output voltage of the voltage elevator, the value of said target voltage depending on a corresponding value of said second control signal.

9. The microelectromechanical gyroscope according to claim 2, further comprising a filter coupled between said differential read amplifier and said driving device and having a passband including said driving frequency, wherein said differential read amplifier, said filter and said driving device are connected to form an oscillating feedback loop that includes said driving mass.

10. The microelectromechanical gyroscope according to claim 9, wherein said driving device comprises a synchronization circuit associated to said controller and configured to clock said controller based on said first intermediate signals.

11. The microelectromechanical gyroscope according to claim 10, wherein said synchronization circuit comprises a phased locked loop (PLL) circuit.

12. The microelectromechanical gyroscope according to claim 11, wherein said synchronization circuit comprises a second comparator having inputs coupled to outputs of said filter and an output coupled to said PLL circuit, the second comparator being configured to supply a first clock signal in the form of a square-wave voltage having a first value in a first half-period and a second value in a second half-period, wherein the filter is configured to produce voltages have a first sign during the first half-period and a second sign, opposite to the first sign, during the second half-period.

13. The microelectromechanical gyroscope according to claim 12, wherein said PLL circuit has an output coupled to a clock input of said first controller and is configured a second clock signal 90 degrees out of phase with respect to said first clock signal.

14. A system, comprising:
a control unit; and
a microelectromechanical gyroscope coupled to the control unit, the gyroscope including:
a body;
a microelectromechanical control loop configured to have a loop gain, and including:
a driving mass mobile with respect to the body with a first degree of freedom according to a driving axis; and
a differential read amplifier configured to supply first signals indicating a rate of oscillation of said driving mass;
a driving device coupled to the driving mass and configured to supply, based on said first signals, second signals to drive said driving mass to keep the driving mass in oscillation according to the driving axis at a driving frequency; and
a voltage elevator coupled to the driving device and configured to provide to the driving device a first power supply signal having a first power supply value;
a sensing mass mechanically coupled to the driving mass and configured to move according to the driving axis, the sensing mass being mobile with respect to the driving mass with a second degree of freedom according to a sensing axis, in response to rotations of the body, wherein:

the microelectromechanical control loop is configured to have the loop gain of a first gain value during a start-up phase of said microelectromechanical gyroscope, the driving device is configured to be supplied by the first power supply signal during the start-up phase, the microelectromechanical control loop is configured to have the loop gain of a second gain value outside said start-up phase of said microelectromechanical gyroscope, the driving device is configured to be supplied by a second power supply signal having a second power supply value outside of said start-up phase, and the first gain value is higher than the second gain value and/or the first power supply value is higher than the second power supply value.

15. The system according to claim 14, wherein said microelectromechanical control loop comprises:

a variable-gain amplifier included in the driving device and configured to receive said first power supply signal from the voltage elevator, receive said first signals from the differential read amplifier, and supply said second signals based on said first signals;

a controller configured to generate a first control signal to control a gain of said variable-gain amplifier in such a way that said microelectromechanical control loop has a gain higher than one during a start-up phase of said microelectromechanical gyroscope; and a first comparator operatively coupled to the variable-gain amplifier and configured to generate a second control signal indicative of said start-up phase and configured to control at least one among: (i) the variable-gain amplifier in such a way that the gain of the variable gain amplifier has the first gain value higher than the second gain value only during said start-up phase, and (ii) said voltage elevator in such a way that causes the voltage elevator to supply to the variable-gain amplifier the first power supply signal, higher than the second power supply signal, only during said start-up phase.

16. The system according to claim 15, wherein the first comparator is configured to generate the second control signal based on a comparison of the first control signal with a threshold indicative of an operative condition of the first control signal, said start-up phase of said microelectromechanical gyroscope being a time period during which the first control signal is above the threshold.

17. The system according to claim 16, wherein the operative condition is a saturation of the first control signal.

18. The system according to claim 15, wherein the first comparator is configured to generate the second control signal based on a comparison of an error signal with a threshold, said start-up phase being a time period during which the error control signal is above the threshold, the error signal being a signal difference between a target amplitude of oscillation of the sensing mass and an effective amplitude of oscillation of the sensing mass.

19. The system according to claim 15, wherein the voltage elevator is configured to reach the second power supply value during said start-up phase, and reach the first value before and/or after said start-up phase.

20. The system according to claim 15, wherein the voltage elevator includes a charge pump circuit.

21. The system according to claim 20, wherein the voltage elevator further comprises a clock driver operatively coupled with the charge pump circuit and configured to provide a clock signal to the charge pump circuit in such a way to maintain an output voltage of the charge pump circuit near a target voltage having a value related to a corresponding value of said second control signal.

22. The system according to claim 21, wherein the voltage elevator further comprises a second comparator configured to output a compared signal based on a comparison between a reference voltage that is proportional to said target voltage and a voltage that is proportional to the output voltage of the voltage elevator, the value of said target voltage depending on a corresponding value of said second control signal.

23. The system according to claim 15, further comprising a filter coupled between said differential read amplifier and a driving-and-control stage and having a passband including said driving frequency, wherein said differential read amplifier, said filter and said driving device are connected to form an oscillating feedback loop that includes said driving mass.

24. The system according to claim 23, wherein said driving device comprises a synchronization circuit associated to said controller and configured to clock said controller based on said first signals.

25. The system according to claim 24, wherein said synchronization circuit comprises a phase locked loop (PLL) circuit.

26. The system according to claim 25, wherein said synchronization circuit comprises a second comparator having inputs coupled to outputs of said filter and an output coupled to said PLL circuit, the second comparator being configured to supply a first clock signal in the form of a square-wave voltage having a first value in a first half-period and a second value in a second half-period, wherein the filter is configured to produce voltages have a first sign during the first half-period and a second sign, opposite to the first sign, during the second half-period.

27. The system according to claim 26, wherein said PLL circuit has an output coupled to a clock input of said controller and is configured to supply a second clock signal 90 degrees out of phase with respect to said first clock signal.

28. A method, comprising:

driving a microelectromechanical gyroscope that includes a body and a driving mass, which is mobile with respect to the body with a first degree of freedom according to a driving axis, and a sensing mass, which is mechanically coupled to the driving mass and configured to move with the driving axis and is mobile with respect to the driving mass with a second degree of freedom according to a sensing axis, in response to rotations of the body;

oscillating the driving mass according to the driving axis at a driving frequency with a driving device that is part of a microelectromechanical control loop that has a loop gain and includes the body and the driving mass;

moving the sensing mass according to the driving axis and the sensing axis;

detecting a start-up phase of said microelectromechanical gyroscope;

supplying, by a differential read amplifier, first signals indicating a rate of oscillation of the driving mass;

supplying, by said driving device, second signals that drive said driving mass based on said first signals;

controlling, during the start-up phase of said microelectromechanical gyroscope, the loop gain to a first gain value;

providing, by a voltage elevator, a first power supply signal having a first power supply value;

supplying, during the start-up phase of said microelectromechanical gyroscope, said driving device by said first power supply signal;

controlling, outside the start-up phase of said microelectromechanical gyroscope, the loop gain to a second gain value; and supplying, outside the start-up phase of said microelectromechanical gyroscope, said driving device by a second power supply signal having a second power supply value, the first gain value being higher than the second gain value and/or the first power supply value being higher than the second power supply value.

29. The method according to claim 28, further comprising:

generating a first control signal to control a gain of a variable-gain amplifier in such a way that said microelectromechanical control loop has a gain higher than one during a start-up phase of said microelectromechanical gyroscope;

generating a second control signal; and controlling, during said start-up phase by the second control signal, at least one among: (i) a gain of the variable-gain amplifier at the first gain value, and (ii) a value of the first power supply signal, supplied by said voltage elevator to the variable-gain amplifier.

30. The method according to claim 29, wherein generating the second control signal includes comparing the first control signal with a threshold indicative of an operative condition of the first control signal, said start-up phase being the time period during which the first control signal is above the threshold.

31. The method according to claim 30, wherein the operative condition is a saturation of the first control signal.

32. The method according to claim 29, wherein generating the second control signal includes comparing an error signal with a threshold, said start-up phase being the time period during which the an error signal is above the threshold, the error signal being a signal difference between a target amplitude of oscillation of the sensing mass and an effective amplitude of oscillation of the sensing mass.

* * * * *